Jan. 28, 1941.   J. L. WALL   2,230,172
CRANKSHAFT GOVERNOR
Filed Aug. 5, 1938
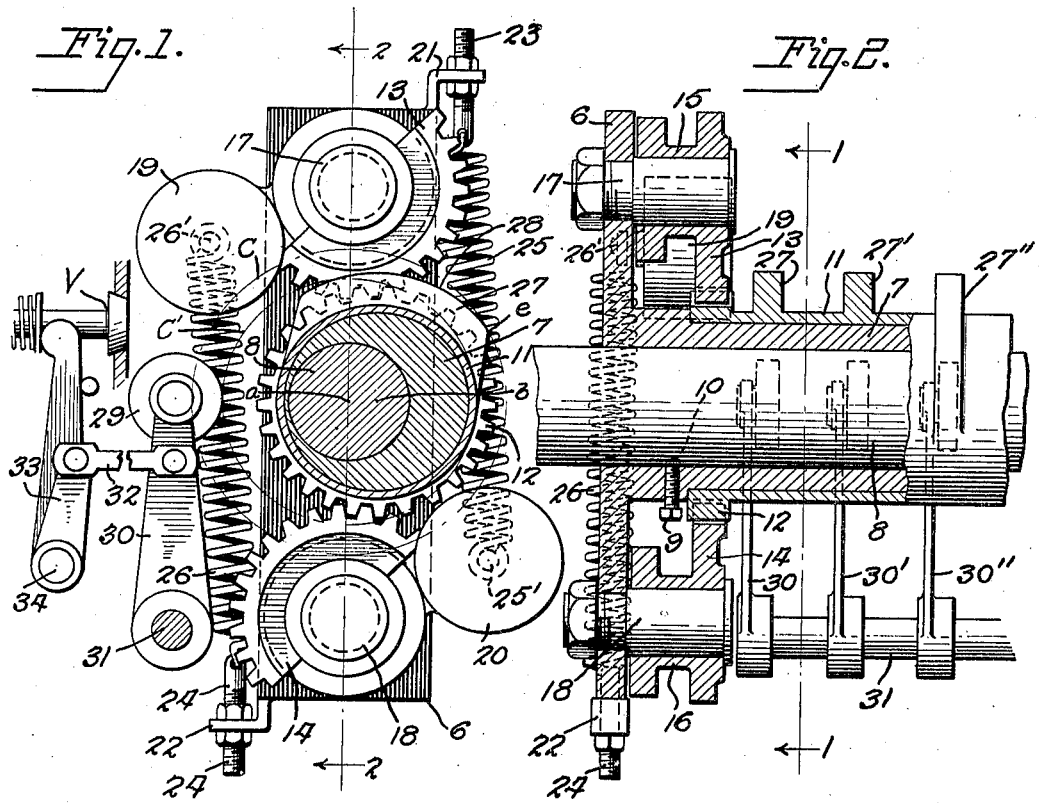
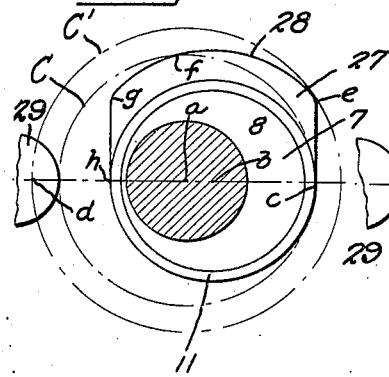
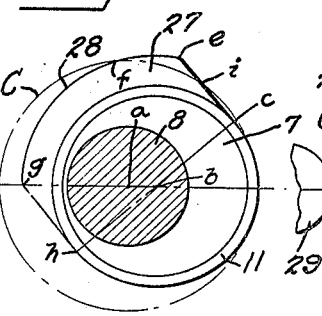
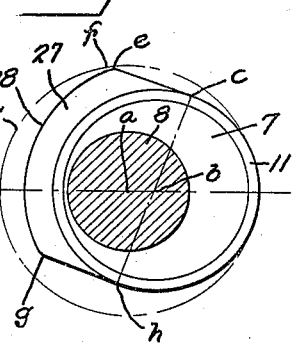
Inventor
J. L. Wall Patented Jan. 28, 1941

2,230,172

UNITED STATES PATENT OFFICE 2,230,172

CRANKSHAFT GOVERNOR

James L. Wall, Washington, Ga., assignor of one-half to Pratt A. Carter, Washington, Ga.

Application August 5, 1938, Serial No. 223,317

3 Claims. (Cl. 121—174)

This invention relates to crankshaft governors generally; and more particularly to crankshaft governors designed for use on steam engines of the piston type.

The main object of the invention is to provide a governor to control the inlet valves of steam engines and adapted to be applied to a crankshaft so as to open the inlet valve at exactly the same time and in exactly the same relation to a rotating crankshaft to hold the valve open only for the length of the engine stroke required to furnish steam sufficient to carry the load to be driven, and to allow for expansion of the steam throughout the remainder of the engine stroke after the closing of the valve.

Another object of the invention is to provide governor mechanism constructed for connection to a crankshaft so as to eliminate vibration of the governor weights and springs.

Still another object of the invention is to provide a governor mechanism adapted to be connected to the crankshaft of an engine to control the operation of the inlet valves of any number of engine cylinders.

Other objects of the invention will become apparent as the detailed description thereof proceeds:

In the drawing:

Figure 1 is a cross section of a preferred form of governor mechanism, the section being taken on the line 1—1 of Figure 2;

Figure 2 is a longitudinal section taken on the line 2—2 of Figure 1; and

Figures 3, 4 and 5 are geometric diagrams illustrating the geometrical principle involved in a design of the valve operating cam mechanism of the governor.

The governor mechanism comprises a substantially rectangular base plate 6 having a collar 7 extending from one side thereof to fit snugly on a crankshaft 8. The base plate 6 and collar 7 are secured to the shaft 8 by means of a screw 9 screw-threaded radially through the collar 7 to seat in the recess 10 formed in the periphery of the shaft 8. The collar 7 is cylindrical on its outer surface and larger in diameter than the crankshaft and is mounted on said crankshaft as an eccentric on which is rotatably mounted a cam sleeve 11.

The sleeve 11 has a spur gear 12 formed on one end thereof to mesh with a pair of segmental gears 13 and 14 formed on collars 15 and 16 which are mounted to rotate on pivot bolts 17 and 18 suitably secured to the base plate 6. Weights 19 and 20, formed integral with the collars 15 and 16, respectively, are suitably welded to the adjacent ends of the segmental gears 13 and 14. The diagonally opposite ends of the base plate 6 are provided with brackets 21 and 22 apertured to receive the adjustable screw-threaded rods 23 and 24, respectively, adapted to be held in adjusted position in the brackets 21 and 22 by clamp nuts engaging said rods on opposite sides of the brackets 21 and 22.

A tension spring 25 is secured at one end to the rod 23 and at its other end is suitably secured to a pin 25' projecting axially from the center of the weight 20. Similarly, a tension spring 26 is secured at one end to the rod 24 and at its other end to a pin 26' extending axially from the weight 19. Obviously, the segmental gears 23, 24 and the centrifugal weights 19 and 20 and the spring members must be symmetrically arranged with respect to any plane passing through the axis $a$ of the crankshaft 8.

For the purpose of operating an inlet valve V of a steam engine, the sleeve 11 is formed with a cam 27 having an arcuate edge 28 adapted to wipe against a roller 29 formed on one end of a lever arm 30 pivoted to rock about a pivot pin 31 suitably secured to the framework (not shown) of the engine. A link 32, pivoted at its opposite ends to the lever arm 30 and to one arm of a bell crank 33, rocks the bell crank about the pivot pin 34 to open the valve V and admit steam to the cylinder of a steam engine. The structural details of this valve operating mechanism form no part of the present invention and is illustrated herein merely for the purpose of explaining the principle of the governor mechanism forming the subject matter of this application.

As shown in Figures 1, 3, 4 and 5 of the drawing, the wiping edge 28 of the cam 27 is an arc of a cylinder having its axis $b$ offset laterally through the distance $a$—$b$ in a plane passing through both axes $a$ and $b$ and bisecting the eccentric collar 7 symmetrically. The distance $a$—$b$ is the lateral offset required to open the valve V to its maximum.

In setting out the cam edge 28, and assuming a counter-clockwise rotation of the crankshaft 8, concentric circles C and C' are struck from $a$ as center with radii $a$—$c$ and $a$—$d$ respectively, the circle C being tangent to the outer surface of the sleeve 11 when at rest, and with the points $c$ and $d$ lying in a straight line passing through the line $a$—$b$. The radius $a$—$d$ is equal to the radius $a$—$c$ plus the "throw" $a$—$b$ of the eccentric 7.

A tangent c—e is drawn from the point c to intersect the circle C' at the point e. With b as center and radius b—e, the arc e—f is struck to intersect the circle C in the point f, through which the arc e—f may be continued to intersect the tangent g—h drawn from the outer surface of the sleeve 11 parallel to the tangent c—e.

If we consider the point f as a fixed point on the base plate 6, it is evident that the curved surface e—g of the cam 27 must always intersect the circle C at that point f. This means that in all positions of the cam 27, its cam edge 28 strikes the roller 29 to open the inlet valve V at exactly the same time in relation to the angular position of the crankshaft 8 to which the base plate 6 is fixed.

The position of the cam 27 at the start of rotation of the crankshaft 8 is shown in Figures 1 and 3. It will be apparent from these figures, that as the shaft 8 rotates, the plate 6 rotates with it, and carries around the cam 27 so that the point on the arcuate edge 28 directly above the imaginary point f on the base plate 6 strikes first against the roller 29, which then rides along the edge 28 past the point e and along the tangent e—c to the point c, at which point the roller 29 is released. During the remaining part of the rotation of the crankshaft 8, the valve V is closed and the steam is allowed to expand in the cylinder.

As the speed of rotation of the crankshaft increases, the weights 19 and 20 spread apart by centrifugal force and rotate the sleeve 11 around the eccentric collar 7, to move the cam 27 into the position shown in Figure 4. From Figure 4, it will be apparent that the cam edge 28 will not strike the roller 29 until it reaches that part directly over the imaginary point f on the base plate 6. The roller 29 will then ride over a smaller portion of the cam edge 28 and around the point e and then along that part of the tangent e—c to the point i, where the roller becomes released from the cam and the valve V closed.

In Figure 5, the crankshaft is illustrated with the cam mechanism in the position required by maximum speed. In this position the governor mechanism has rotated the cam sleeve 11 around the eccentric collar 7 so far as to prevent any contact of the cam 8 with the roller 29.

It is evident that the cam 28 strikes the roller 29 to open the inlet valve at exactly the same time and in exactly the same space relation to the angular position of the crankshaft 8. It is also evident that this cam construction holds the inlet valve open only for the length of engine stroke required to furnish enough steam to carry the load to be driven, and allows the steam to expand during the remainder of the engine stroke.

This governor mechanism takes the load of opening the valve directly against the cam surface of the sleeve 11, and transfers the load therefrom directly to the eccentric collar 7. Since the eccentric collar is fixed rigidly to the shaft, all vibration of the governor weights and springs is eliminated.

The eccentric collar 7 and the cam sleeve 11 may be extended in length as illustrated in Figure 2 of the drawing, and additional cams 27', 27'', etc., may be formed on the sleeve 11 to be timed with and govern the opening of inlet valves of any number of engine cylinders without adding to the governor mechanism described. In other words, a single governor of this type may be used to control all the valves of an engine having any desired number of cylinders.

What I claim is:

1. Governor mechanism comprising a collar adapted to be fixed eccentrically on a crankshaft, a sleeve rotatable on said collar having a cylindrical cam surface co-axial with the axis of said collar, and means to rotate said sleeve on said collar, in accordance with variations in the rotary speeds of the shaft.

2. Governor mechanism comprising a collar having a cylindrical outer surface adapted to be fixed as an eccentric to a rotating shaft, a cylindrical sleeve rotatable on said collar having a cam formed thereon with a cylindrical cam surface co-axial with the axis of said collar, and intersecting a straight cam surface tangent to a diameter to the sleeve and means to rotate said sleeve on said collar in accordance with variations in the rotary speeds of said shaft.

3. Governor mechanism comprising a collar adapted to be fixed eccentrically on a crank shaft, a sleeve rotatably mounted on the collar and having formed thereon a cam surface comprising a segmental cylindrical surface concentric with the collar and a plane surface perpendicular to the chord of said cylindrical segment and speed responsive means for rotating said sleeve on said collar.

JAMES L. WALL.